(12) United States Patent
Lapp et al.

(10) Patent No.: US 8,424,445 B2
(45) Date of Patent: Apr. 23, 2013

(54) CONNECTING ROD BORE

(75) Inventors: Michael T. Lapp, Bloomfield, MI (US); Dan H. Dinu, Windsor (CA); Roger Krause, Howell, MI (US)

(73) Assignee: Mahle International GmbH (DE)

( * ) Notice: Subject to any disclaimer, the term of this patent is extended or adjusted under 35 U.S.C. 154(b) by 995 days.

(21) Appl. No.: 12/476,382

(22) Filed: Jun. 2, 2009

(65) Prior Publication Data

US 2010/0300282 A1 Dec. 2, 2010

(51) Int. Cl.
*F16C 7/00* (2006.01)
*F16C 7/06* (2006.01)

(52) U.S. Cl.
USPC .......................................................... 92/187

(58) Field of Classification Search ............... 92/187
See application file for complete search history.

(56) References Cited

U.S. PATENT DOCUMENTS

| | | | |
|---|---|---|---|
| 3,161,185 A | 12/1964 | Justinien et al. | |
| 3,830,341 A | 8/1974 | Davies et al. | |
| 3,908,623 A * | 9/1975 | McWhorter | 92/187 |
| 4,463,710 A * | 8/1984 | McWhorter | 123/48 B |
| 5,156,121 A * | 10/1992 | Routery | 92/187 |
| 5,239,958 A * | 8/1993 | Booher | 123/197.2 |
| 5,248,878 A | 9/1993 | Ihara | |
| 5,724,935 A * | 3/1998 | Routery | 123/197.4 |
| 6,250,275 B1 | 6/2001 | Bock et al. | |
| 6,481,389 B2 | 11/2002 | Suzuki et al. | |
| 6,513,477 B1 | 2/2003 | Gaiser et al. | |
| 6,565,258 B1 | 5/2003 | Yamada et al. | |
| 6,651,607 B2 * | 11/2003 | Towler | 123/197.3 |
| 7,107,893 B2 | 9/2006 | Weinkauf et al. | |
| 7,118,279 B2 | 10/2006 | Fujita et al. | |
| 7,305,960 B2 | 12/2007 | Zvonkovic | |
| 2003/0128903 A1 | 7/2003 | Yasuda et al. | |
| 2004/0228554 A1 | 11/2004 | Fujita et al. | |
| 2006/0101642 A1 | 5/2006 | McEwan | |
| 2007/0204746 A1 | 9/2007 | Issler et al. | |

FOREIGN PATENT DOCUMENTS

| | | |
|---|---|---|
| DE | 120811 B | 12/1965 |
| DE | 3144720 A1 | 5/1983 |
| DE | 4034808 A1 | 5/1991 |
| DE | 19700339 A1 | 7/1997 |
| DE | 19911339 A1 | 9/2000 |
| DE | 10029950 A1 | 1/2002 |
| DE | 10233263 A1 * | 2/2004 |
| DE | 10247130 A1 | 4/2004 |

(Continued)

OTHER PUBLICATIONS

International Search Report from PCT/EP2010/003261 dated Nov. 2, 2010 (5 pages).

*Primary Examiner* — Thomas E Lazo
(74) *Attorney, Agent, or Firm* — Rader, Fishman & Grauer PLLC

(57) ABSTRACT

A linking arm conveying generally linear movement from a piston into generally radial movement of a crankshaft is disclosed. The linking arm includes a shaft extending between a piston pin end and a crankshaft pin end. The piston pin end defines a piston pin bore. A piston pin bore surface is defined by the piston pin bore, where the piston pin bore includes a non-circular transverse profile having at least two curved surfaces that each include a distinct radius, where the at least two curved surfaces are positioned in different locations around a periphery of the transverse profile.

20 Claims, 5 Drawing Sheets

FOREIGN PATENT DOCUMENTS

| | | |
|---|---|---|
| DE | 10305461 A1 | 8/2004 |
| DE | 102004024576 A1 | 12/2005 |
| DE | 102005043217 A1 | 3/2007 |
| DE | 102006013399 A1 | 7/2007 |
| EP | 1167737 A2 | 1/2002 |
| FR | 1300937 A | 8/1962 |
| GB | 2319582 A | 5/1998 |
| GB | 2330788 A | 5/1999 |
| JP | 06173937 A | 6/1994 |
| JP | 09049489 A | 2/1997 |
| JP | 10131729 A | 5/1998 |
| KP | 1055150 | 4/2001 |
| KR | 3050301 | 6/2003 |
| KR | 3090296 | 11/2003 |
| KR | 20090009469 A | 1/2009 |
| RU | 2204735 C1 | 5/2003 |
| WO | WO-92/07200 A1 | 4/1992 |
| WO | WO-2007073720 A1 | 7/2007 |

\* cited by examiner

CONNECTING ROD BORE

BACKGROUND

The traditional internal combustion engine relies on connecting rods for transmitting combustion power from a piston main body to a crankshaft of the engine, thereby converting the linear motion of the piston main body to rotational motion at the crankshaft. The connecting rod includes two bores, a crankshaft bore and a piston pin bore. The crankshaft bore receives a crankpin that pivotally connects the connecting rod to the crankshaft, and the piston pin bore receives a piston pin that pivotally connects the connecting rod to the piston. During operation of the engine, the piston pin may move about inside of the piston pin bore, traveling in a generally linear direction.

In one example the piston pin may impact opposing surfaces of the piston pin bore as the piston travels between the top dead center position (TDC) and the bottom dead center position (BDC) in relation to the crankshaft. The impact between the piston pin and the upper and lower surfaces of the piston pin bore may create unwanted noise that may be audible to a user during operation of the engine.

Accordingly, there is a need in the art for a connecting rod including a piston pin bore that allows the piston pin to travel inside of the bore while reducing unwanted noise during operation.

BRIEF DESCRIPTION OF THE DRAWINGS

While the claims are not limited to the illustrated embodiments, an appreciation of various aspects is best gained through a discussion of various examples thereof. Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limiting or restricting to the precise form and configuration shown in the drawings and disclosed in the following detailed description. Exemplary embodiments of the present invention are described in detail by referring to the drawings as follows:

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Figure 1:
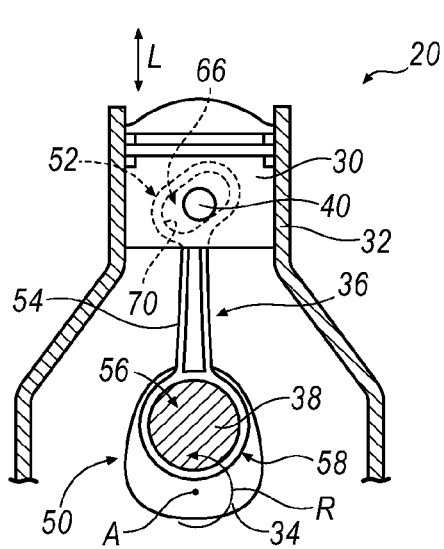
FIG. 1 is a partially sectioned view of an exemplary piston cylinder assembly including a connecting rod and a piston pin.

FIG. 1 illustrates an exemplary piston cylinder assembly 20. The piston cylinder assembly 20 may include a linking arm or connecting rod 36 and a piston pin 40 received within a piston pin bore 66. Referring generally to FIGS. 1 and 2, the connecting rod 36 may include a crankshaft or large end 50 and a piston pin or small end 52. The piston pin end 52 of the connecting rod 36 defines the piston pin bore 66 that receives the piston pin 40. The piston pin bore 66 may include a cross section or transverse profile 70 that may be generally non-circular. The transverse profile 70 includes at least two curved surfaces that each includes a distinct radius. The at least two curved surfaces may be positioned in different locations around a periphery of the transverse profile 70. For example, in one illustration the transverse profile 70 includes a first curved surface 72 and a second curved surface 74 that are positioned about 180 degrees (180°) apart from one another on generally opposing sides of the piston pin bore 66. During operation of the piston cylinder assembly 20, the piston pin 40 may maintain continuous contact with at least a portion of the periphery of the piston pin bore 66.

The transverse profile 70 of the piston bin bore 66 is illustrated in the figures with a slightly exaggerated non-circular shape, in an effort to show the non-circular profile with the at least two curved surfaces. Moreover, although FIG. 1 illustrates a noticeable clearance between the piston pin 40 and the piston pin bore 66, in practice there may be a smaller clearance between the piston pin 40 and the piston pin bore 66 that is not clearly visible when illustrated.

Continuing to refer to FIG. 1, the piston cylinder assembly includes a piston 30, a cylinder 32, a crankshaft 34, the connecting rod 36, a crankshaft pin 38, and the piston pin 40. The piston 30 moves within the cylinder 32 in a generally linear axial direction L, and the crankshaft 34 rotates about an axis A, thereby creating a radial motion R. The connecting rod 36 acts as a linking arm to convey the generally linear movement L of the piston 30 into the generally radial movement R of the crankshaft 34.

The crankshaft 34 may be pivotally connected to the connecting rod 36 by the crankshaft pin 38 on the crankshaft or large end 50. The piston 30 may be connected to the connecting rod 36 by the piston pin 40 on the piston pin or small end 52. During operation of the piston cylinder assembly 20 the connecting rod 36 moves in an angled reciprocating motion, defined by the general rotational movement of the crankshaft end 50 and the general linear movement of the piston pin end 52.

In one example the connecting rod 36 may be utilized in a piston cylinder assembly 20 of an internal combustion engine, however the connecting rod 36 may be used in any type of reciprocating motion machine, such as, for example, a pump. The connecting rod 36 includes a shaft 54 extending between the piston pin end 52 and a crankshaft end 50. The crankshaft end 50 of the connecting rod 36 defines a crankshaft bore 56 for receiving the crankshaft pin 38. In one example, the crankshaft bore 56 includes a generally circular cross section or transverse profile 58.

Figure 2A:
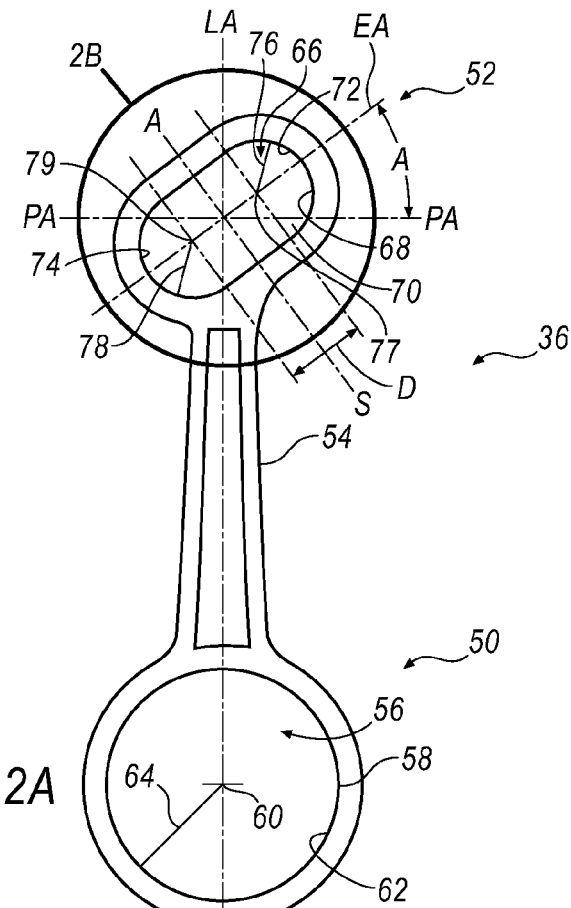
FIG. 2A is a front view of the connecting rod.

Turning now to FIG. 2A, the crankshaft bore 56 may include a crankshaft bore center 60 and a crankshaft bore surface 62. The crankshaft bore 56 may include a generally constant crankshaft bore radius 64 measured from the center 60 to the crankshaft bore surface 62.

Figure 2B:
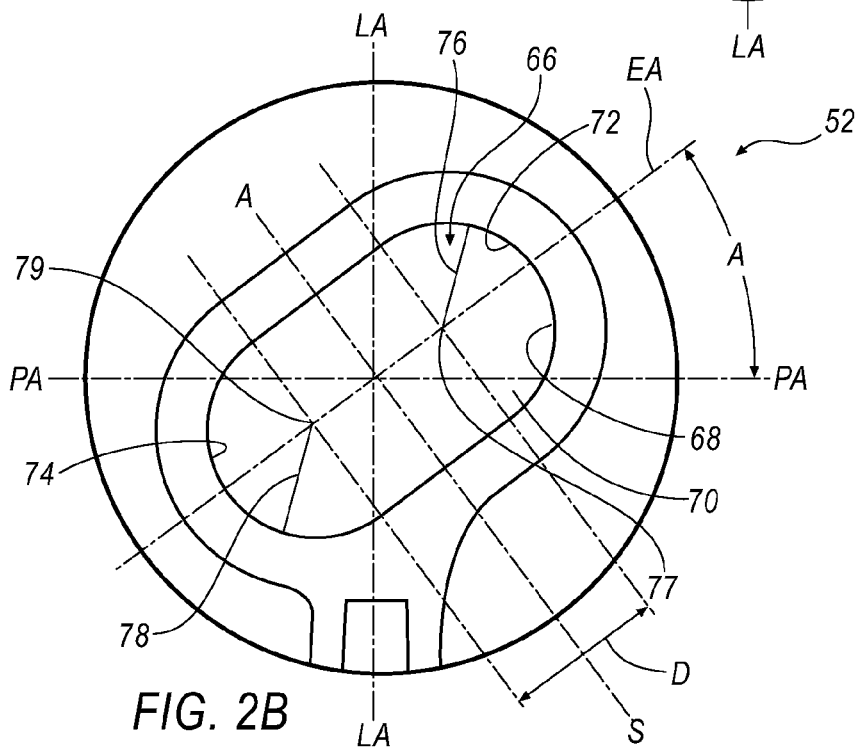
FIG. 2B is an enlarged view of the piston pin end of the connecting rod in FIG. 2A.

Referring generally to FIGS. 2A and 2B, the piston pin bore 66 includes a piston pin bore surface 68 defined by the piston pin bore 66. The cross section or transverse profile 70 of the piston pin bore 66 may include the at least two distinct curved surfaces that each include a distinct radius. The at least two curved surfaces may be positioned in different locations around the periphery of the transverse profile 70, illustrated as the first curved surface 72 and the second curved surface 74. FIGS. 2A and 2B illustrate the transverse profile 70 with the first curved surface 72 and the second curved surface 74 positioned about 180 degrees (180°) apart from one another on opposing sides of the piston pin bore 66. However, it is understood that the first curved surface 72 and the second curved surface 74 may be positioned apart from one another in other configurations as well.

Figure 4A:
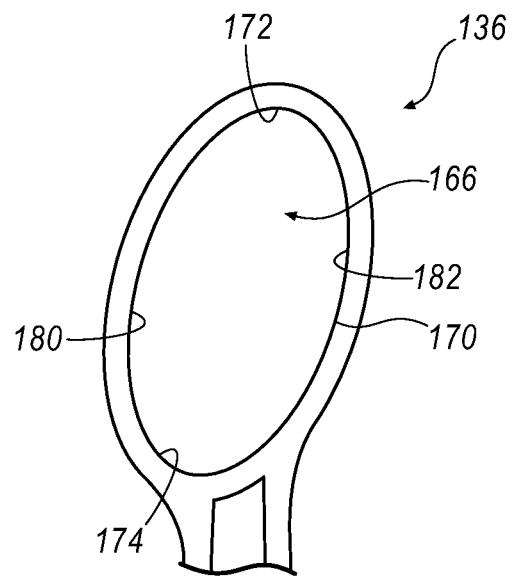
FIG. 4A is a front view of an alternative illustration of a piston pin end of the connecting rod including an oval transverse profile.
Figure 4B:
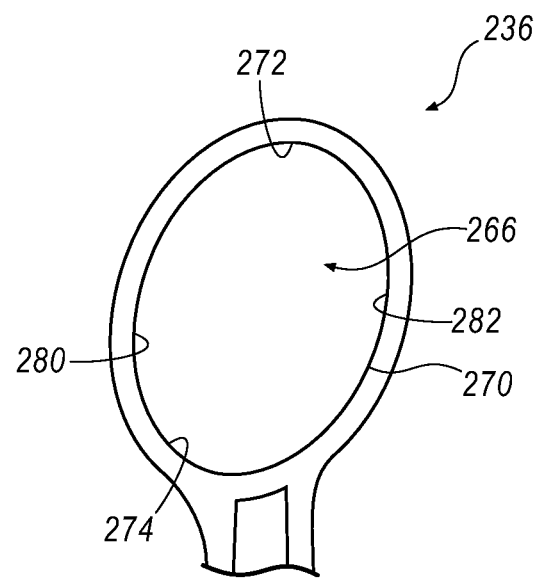
FIG. 4B is a front view of an alternative illustration of the piston pin end of the connecting rod including an elliptical transverse profile.

The at least two distinct curved surfaces 72 and 74 may be connected to one another by a generally linear surface, which is illustrated as distance D. FIG. 2A illustrates the distance D separating the first curved surface 72 from the second curved surface 74. Alternatively, in another example the at least two curved surfaces may also be connected to one another by another curved surface, as illustrated in FIGS. 4A-4B.

The first curved surface 72 includes a first radius 76 and a first center point 77, and the second curved surface 74 includes a second radius 78 and a second center point 79. The first radius 76 may be about equal to the second radius 78. Alternatively, in another illustration the first radius 76 may be either greater than or less than the second radius 78. The first center point 77 may be positioned at the distance D from the second center point 79, where the distance D is located between the first center point 77 and the second center point 79. The first center point 77 may be generally aligned with the second center point 79 to create an axis of eccentricity EA of the piston pin bore 66, where the axis of eccentricity EA represents the longer axis of the piston pin bore 66. In one example the axis of eccentricity EA may be positioned at an angle A that is non-perpendicular to the shaft 54. That is, the axis of eccentricity EA may be non-perpendicular to a longitudinal axis LA of the connecting rod 36. In another example, the axis of eccentricity EA may be generally perpendicular and angled at about ninety degrees (90°) with respect to the shaft 54 and the longitudinal axis LA of the connecting rod 36. In yet another example, the axis of eccentricity EA may also be generally aligned with the longitudinal axis LA, where the angle A is either about zero or one-hundred and eighty degrees (0° or 180°) from the longitudinal axis LA, depending on the direction the angle A is measured. The angle A may be measured between a perpendicular axis PA of the piston pin bore 66 and the axis of eccentricity EA, and may be oriented at any position between the longitudinal axis LA and the perpendicular PA of the piston pin bore 66. The perpendicular axis PA may be substantially normal to the longitudinal axis LA of the connecting rod 36.

The transverse profile 70 may also be generally symmetrical about at least one axis of the piston pin bore 66. In the illustration of FIGS. 2A-2B, the piston pin bore is generally symmetrical about the axis of eccentricity EA. The piston pin bore 66 may also include a second axis, which is illustrated as an axis of symmetry AS, where the piston pin bore 66 may also be symmetrical about the axis of symmetry AS. The axis of symmetry AS may be positioned generally perpendicular to the axis of eccentricity EA. In this example, the piston pin bore 66 is generally symmetrical about both of the axis of eccentricity EA as well as the axis of symmetry AS, however, other configurations may be included as well. For example, in one alternative illustration, the piston pin bore 66 may be asymmetrical about the axis of symmetry AS (illustrated in FIG. 6).

In the example of FIGS. 2A-2B, the connecting rod may include a bushingless pin bore. However, in an alternative illustration a bushing may be included within the piston pin bore 66 if desired. The transverse profile 70 of the piston pin bore 66 may be produced by a machining operation, where material is removed directly from the piston pin bore 66. However, other manufacturing operations may be used as well to create the piston pin bore 66, such as, for example, forging and casting. The piston pin bores may also include an anti-friction coating applied along at least a portion of the piston pin bore surface 68. The anti-friction coating may be any coating that improves wear or scuffing resistance of the piston pin bore surface 68, such as, but not limited to, a manganese-phosphate coating.

Figure 3A:
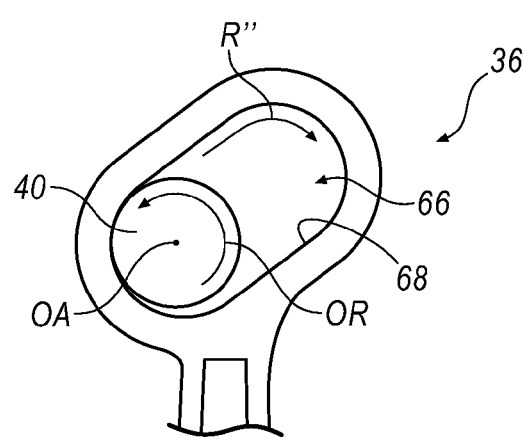
FIG. 3A is a front view of the piston pin end of the connecting rod and the piston pin, where the piston pin is in a first position within a piston pin bore.
Figure 3B:
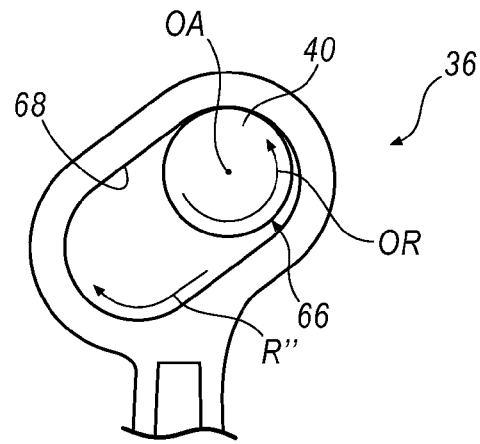
FIG. 3B is a front view of the piston pin end of the connecting rod and the piston pin, where the piston pin is in a second position within the piston pin bore.

FIGS. 3A and 3B illustrate the operation of the piston pin 40 within the piston pin bore 66 during operation of the piston cylinder assembly 20. FIG. 3A illustrates the piston pin 40 positioned within the piston pin bore 66 at a first position, and FIG. 3B illustrates the piston pin 40 positioned within the piston pin bore 66 at a second position. Turning to FIG. 3A, the piston pin 40 includes an operational axis of rotation OA. The piston pin 40 rotates about the operational axis of rotation OA in a direction OR as a result of a force transmitted from the piston pin 40 to the connecting rod 36 and friction therebetween. While still rotating about the operational axis of rotation OA, the piston pin 40 also advances around at least a portion of the piston pin bore surface 68, maintaining continuous contact with at least a portion of the periphery of the piston pin bore 66. That is, the piston pin 40 includes a direction of motion that generally corresponds to the piston pin bore surface 68. The motion of the piston pin 40 along the piston pin bore surface 68 is illustrated as a generally curved path R". The piston pin 40 generally maintains continuous contact with at least a portion of the piston pin bore surface 68 as the piston pin 40 travels along the curved path R".

FIG. 3B illustrates the connecting rod 36 when the piston pin 40 advances to the second position. The piston pin 40 continuously contacts at least a portion of the piston pin bore surface 68 as the piston pin 40 makes a generally smooth transition within the piston pin bore 66 between the first and second positions. That is, the piston pin bore surface 68 provides a surface along which the piston pin 40 may generally roll, thereby following the generally curved path R" during operation. Turning back to FIG. 1, as the piston 30 reciprocates within the cylinder 32, the connecting rod 36 moves about in an angled reciprocating movement. The angled reciprocating movement of the connecting rod 36 generally correlates to the generally curved path R" of the piston pin bore 66. Therefore, during operation of the piston cylinder assembly 20, the piston pin 40 travels in a direction generally corresponding to the movement of the connecting rod 36.

The operation of the piston pin 40 within the piston pin bore 66 may be different from at least some other types of piston pin bores. Turning back to FIGS. 3A-3B, the piston pin 40 maintains continuous contact along at least some portion of the periphery of the piston pin bore 66 in the generally curved path R" during operation of the piston 30, despite the clearance between the piston pin 40 and the piston pin bore 66. In contrast, piston pin bores typically include a generally circular transverse profile. The generally circular transverse profile of the piston bore may not allow for a piston pin to move in a curved path during operation of a piston cylinder assembly. This is because the generally circular transverse profile of the piston pin bore does not usually correspond with the reciprocating movement of the connecting rod. Including a generally circular transverse profile typically results in the piston pin traveling in a linear up and down or side to side motion within the piston pin bore, where the piston pin may impact generally opposing surfaces of the piston pin bore, and losing contact with the bore surfaces entirely during operation. The impact between the piston pin and the inside surfaces of the piston pin bore when the piston pin comes into contact with the bore surface may create unwanted noise during operation of a piston cylinder assembly.

Accordingly, including the piston pin bore 66 with at least two distinct curved surfaces may be advantageous. This is because during operation the piston pin 40 may travel along the generally curved path R" of the piston pin bore 66, thereby maintaining generally continuous contact with at least a portion of the piston pin bore surface 68. In contrast, a piston pin traveling inside a generally circular piston pin bore typically impacts the piston pin bore, creating unwanted noise and also increasing pin bore surface wear. Including the piston pin bore 66 with the at least two distinct curved surfaces may help to reduce this unwanted noise and excessive wear.

Figure 3C:
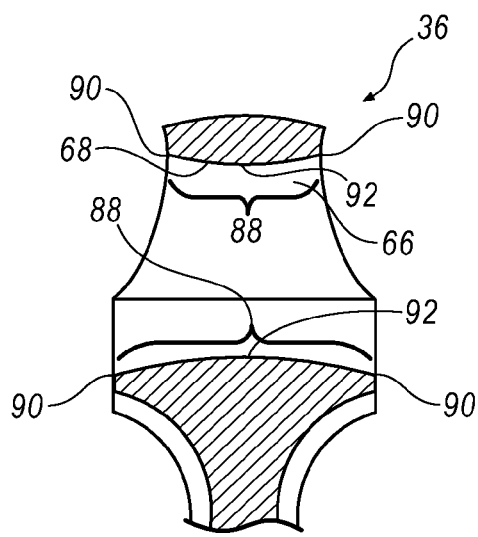
FIG. 3C is a partially sectioned side view of the piston pin end of the connecting rod.

FIG. 3C is a partially cross sectioned side view of the piston pin bore 66 of the connecting rod 36, with the piston pin 40 removed. In one exemplary illustration, the piston pin bore surface 68 may include a generally curved longitudinal surface 88 that may be a substantially convex surface. The generally curved longitudinal surface 88 may also include outer edges 90 positioned below an apex 92 of the generally curved longitudinal surface 88. Including the generally curved longitudinal surface 88 may be advantageous, because the piston pin 40 may experience some amount of bending during operation of the piston cylinder assembly 20. The generally curved longitudinal surface 88 may accommodate at least a portion of the bending of the piston pin 40. More specifically, because the outer edges 90 of the piston pin bore surface 68 are positioned lower than the apex 92, the outer edges do not usually impact the piston pin 40 with the same degree of force that a generally linear longitudinal surface would create. In other words, including a generally curved longitudinal surface 88 may reduce the stress that the piston pin 40 experiences as the piston pin 40 impacts the piston pin bore surface 68 during operation, and also reduces pin bore pound-out and excessive local wear in the piston pin bore by an enhanced tribological interaction.

FIGS. 4-7B illustrate several alternative configurations for the transverse profile of the piston pin bore The transverse profile 70 of the piston pin bore 66 may include various shapes that are non-circular, but may include at least two curved surfaces positioned around the periphery of the transverse profile 70. In one alternative illustration as shown in FIG. 4A, a connecting rod 136 includes a piston pin bore 166. The piston pin bore 166 includes a transverse profile 170 with a generally oval shape. The transverse profile 170 includes a first curved surface 172 and a second curved surface 174. The at least two distinct curved surfaces may be connected to one another by generally curved surfaces 180 and 182.

In another alternative illustration as seen in FIG. 4B, a connecting rod 236 includes a piston pin bore 266. The piston pin bore 266 includes a transverse profile 270 generally shaped as an ellipse. The transverse profile 270 includes a first curved surface 272 and a second curved surface 274. The at least two distinct curved surfaces may be connected to one another by generally curved surfaces 280 and 282.

Figure 5:
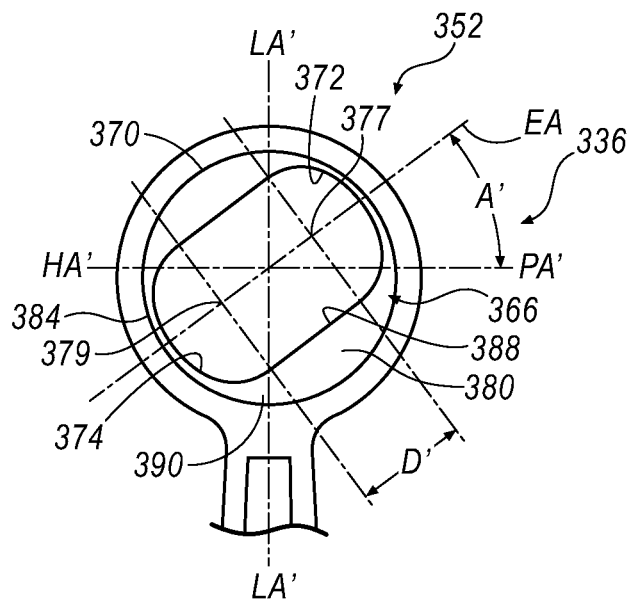
FIG. 5 is a front view of an alternative illustration of the piston pin end of the connecting rod including a bushing.

FIG. 5 is another alternative illustration of a piston pin or small end 352 of a connecting rod 366, where a bushing 380 may be inserted within the piston pin bore 366. Unlike the configurations illustrated in FIGS. 1-3C, the connecting rod 336 does not include a bushingless piston pin bore 366, where at least a portion of an inner surface 388 of the bearing 380 provides a surface for a piston pin to maintain contact with during operation. The piston pin bore 366 includes a generally circular transverse profile 370, and the bushing 380 includes a generally circular outer surface 384 that substantially coincides with the transverse profile 370. The bushing 380 may be secured in the piston pin bore 366 by an interference fit. The bearing 380 includes the inner surface 388, where the inner surface 388 includes a generally non-circular transverse profile 390 with a first curved surface 372 and a second curved surface 374. The inner surface 388 of the bushing 380 provides a surface that a piston pin may contact during operation.

Similar to the transverse profile 70, a first center point 377 may be positioned at a distance D' from the second center point 379. The first center point 377 may also be generally aligned with the second center point 377 to create an axis of eccentricity EA' of the piston pin bore 366, where the axis of eccentricity EA' represents the larger axis of the piston pin bore 366. The axis of eccentricity EA' may be positioned at an angle A' that is non-perpendicular to a longitudinal axis LA' of the connecting rod 136, where the angle A' may be measured between the axis of eccentricity EA' and a perpendicular axis PA' of the piston pin bore 366. The piston pin bore 366 may also include a second axis of symmetry, which is illustrated as an axis of symmetry AS'. The axis of symmetry AS' may be positioned generally perpendicular to the axis of eccentricity EA'.

Figure 6:
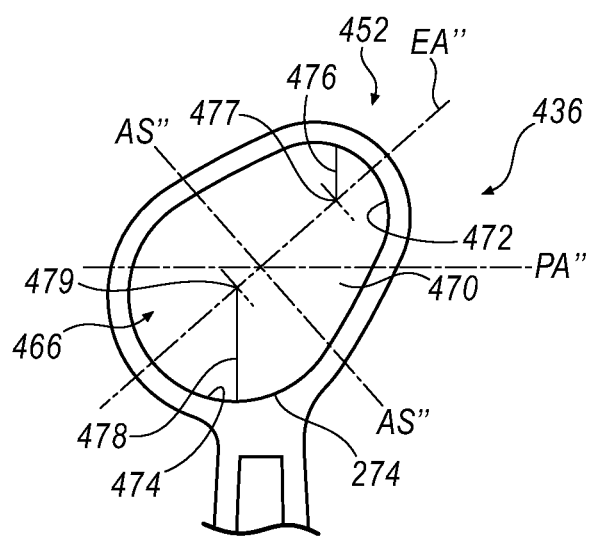
FIG. 6 is a front view of an alternative illustration of the piston pin end of the connecting rod including an asymmetrical transverse profile.

FIG. 6 is an illustration of a piston pin or small end 452 of a connecting rod 436, where a transverse profile 470 of a piston pin bore 466 includes a first curved surface 472 and a second curved surface 474, where the piston pin bore 466 is asymmetrical about an axis of symmetry AS'. The first curved surface 472 includes a first radius 476 and a first center point 477, and the second curved surface 474 includes second radius 478 and a second center point 479. The first radius 476 is illustrated as less than the second radius 478. The first radius 476, however, may also be greater than the second radius 478 in an alternative example. Because the first radius 476 includes a different dimension than the second radius 478 the piston pin bore 466 may be asymmetrical about at least one axis of the piston pin bore 466. In the example as shown in FIG. 6, the piston pin bore 466 is asymmetrical about an axis of symmetry AS", where the axis of symmetry AS" is generally perpendicular to an axis of eccentricity EA". The piston pin bore 466 may be generally symmetrical about the axis of eccentricity EA".

Figure 7A:
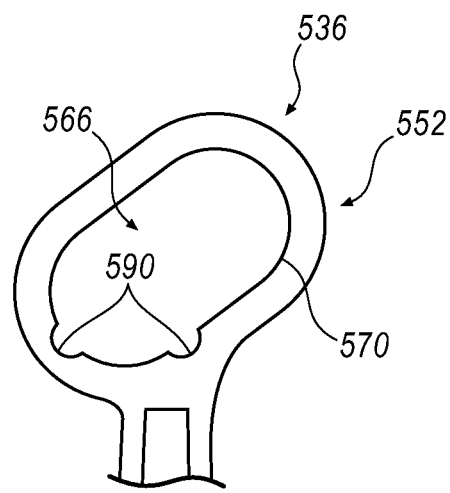
FIG. 7A is a front view of an alternative illustration of the piston pin end of the connecting rod including lubrication slots.

FIG. 7A is alternative illustration of a piston pin or small end 552 of a connecting rod 536, where a transverse profile 570 of a piston pin bore 566 includes lubrication slots 590. The lubrication slots 590 are illustrated as two lubrication slots positioned along a bottom portion of the piston pin bore 566. However, any number of lubrication slots 566 may be included, and the lubrication slots 566 may be placed at any desired location along the transverse profile 570.

Figure 7B:
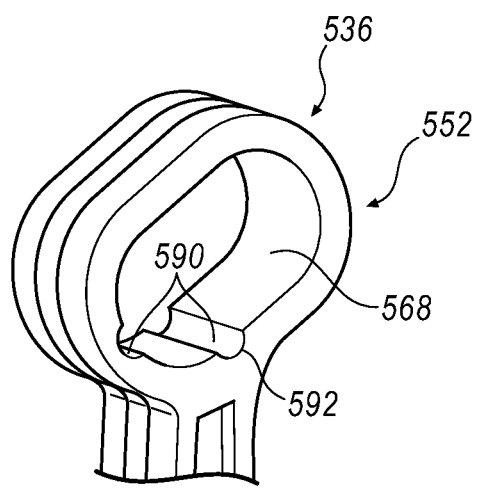
FIG. 7B is a perspective view of the piston pin end of the connecting rod of FIG. 7A.

FIG. 7B is an elevational perspective view of the small end 552 of the connecting rod 536. The lubrication slots 590 may be positioned longitudinally along at least a portion of a piston pin bore surface 568. The lubrication slots 590 may be depressions or indentations located at the piston pin bore surface 568 used to accumulate a lubricant, such as, for example, oil. In one illustrative example the lubrication slots 590 may include a depth of about 0.019 inches (0.5 mm) and a width of about 0.220 inches (5.6 mm).

The lubrication slots 590 may include a generally concave profile 592 with respect to the piston pin bore 566, however, it is understood that the depression may include any shape where lubrication may collect. By including the lubrication slot 590, the lubrication between the contact area of a piston pin (such as the piston pin 40 illustrated in FIGS. 1 and 3A-3B) and the piston pin bore surface 568 may be enhanced. This is because the lubrication slots 590 may increase the amount of lubricant located between the contact area of a piston pin and the piston pin bore surface 568.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A linking arm conveying generally linear movement from a piston into generally radial movement of a crankshaft, comprising:
    a shaft extending between a piston pin end and a crankshaft pin end, the piston pin end defining a piston pin bore; and
    a piston pin bore surface defined by the piston pin bore, the piston pin bore including a non-circular transverse profile having at least two generally curved surfaces that each include a distinct radius;
    wherein the at least two curved surfaces are positioned in different locations around a periphery of the transverse profile;
    wherein the transverse profile includes a first curved surface including a first radius and a second curved surface includes a second radius, and the first radius is one of greater than and less than the second radius.

2. The linking arm of claim 1, wherein a first curved surface and a second curved surface are positioned about 180 degrees apart from one another on generally opposing sides of the piston pin bore.

3. The linking arm of claim 1, wherein the transverse profile of the piston pin bore is one of an ellipse and an oval.

4. The linking arm of claim 1, wherein the transverse profile of the piston pin bore includes at least one axis of symmetry.

5. The linking arm of claim 1, wherein the transverse profile of the piston pin bore is asymmetrical along at least one axis of the transverse profile.

6. The linking arm of claim 1, wherein the transverse profile of the piston pin bore includes an axis of eccentricity that is non-perpendicular to the shaft of the linking arm.

7. The piston assembly of claim 1, wherein the transverse profile of the piston pin bore includes an axis of eccentricity that is angled at about ninety degrees with respect to the shaft of the linking arm.

8. The linking arm of claim 1, wherein the piston pin bore surface is defined by the linking arm.

9. The linking arm of claim 1, further comprising a piston pin bushing located within the piston pin bore, wherein the piston pin bore surface is defined by the piston pin bushing.

10. The linking arm of claim 1, wherein the transverse profile of the piston pin bore is elongated in a direction that is non-perpendicular to the shaft of the linking arm.

11. A connecting rod, comprising:
    a shaft extending between a piston pin end and a crankshaft pin end, the piston pin end defining a piston pin bore; and
    a piston pin bore surface defined by the piston pin bore, the piston pin bore including a non-circular transverse profile; and
    a first curved surface including a first radius and a second curved surface including a second radius, wherein the first curved surface and the second curved surface are positioned in different locations around a periphery of the transverse profile;
    wherein the first radius is one of greater than and less than the second radius.

12. The connecting rod of claim 11, wherein the transverse profile of the piston pin bore is one of an ellipse and an oval.

13. The connecting rod of claim 11, further comprising a piston pin bushing located within the piston pin bore, wherein the piston pin bore surface is defined by the piston pin bushing.

14. An assembly, comprising:
    a connecting rod including:
        a shaft extending between a piston pin end and a crankshaft pin end, the piston pin end defining a piston pin bore; and
        a piston pin bore surface defined by the piston pin bore, the piston pin bore including a non-circular transverse profile having at least two curved surfaces that are positioned in different locations around a periphery of the transverse profile; and
    a piston pin received by the piston pin bore, where the piston pin is configured to move within the piston pin bore in a direction of motion that generally corresponds to at least a portion of the piston pin bore surface, and where the piston pin is configured to maintains continuous contact with at least a portion of the piston pin bore surface as the piston pin travels along the direction of motion during operation of the piston assembly, wherein the piston pin bore surface defines a clearance about the piston pin such that during operation of the assembly the piston pin travels along a curved path with respect to the connecting rod.

15. The assembly of claim 14, wherein the piston pin includes an operational axis of rotation, the piston pin rotating about the operational axis of rotation while maintaining continuous contact with at least a portion of the piston pin bore surface.

16. The assembly of claim 14, wherein the transverse profile of the piston pin bore is one of an ellipse and an oval.

17. The assembly of claim 14, wherein the transverse profile includes a first curved surface including a first radius and the second curved surface includes a second radius, and the first radius is about equal to the second radius.

18. The assembly of claim 14, wherein the transverse profile includes a first curved surface including a first radius and the second curved surface includes a second radius, and the first radius is one of greater than and less than the second radius.

19. The assembly of claim 14, further comprising a piston pin bushing located within the piston pin bore, wherein the piston pin bore surface is defined by the piston pin bushing.

20. The assembly of claim 14, wherein the transverse profile of the piston pin bore is elongated in a direction that is non-perpendicular to the shaft of the connecting rod.

* * * * *